United States Patent [19]

Kaufman et al.

[11] Patent Number: 4,915,118

[45] Date of Patent: Apr. 10, 1990

[54] SMOKING ARTICLE WRAPPER AND METHOD OF MAKING SAME

[75] Inventors: Clifford M. Kaufman, Asheville; Richard H. Martin, Brevard, both of N.C.

[73] Assignee: P. H. Glatfelter Company, Spring Grove, Pa.

[21] Appl. No.: 183,988

[22] Filed: Apr. 20, 1988

[51] Int. Cl.$^4$ .............................................. A24D 1/02
[52] U.S. Cl. ...................................... 131/365; 162/139
[58] Field of Search ....................... 131/365, 331, 332; 162/139

[56] References Cited

U.S. PATENT DOCUMENTS

| | | | |
|---|---|---|---|
| 4,231,377 | 11/1980 | Cline et al. | 131/9 |
| 4,420,002 | 12/1983 | Cline | 131/334 |
| 4,433,697 | 2/1984 | Cline et al. | 131/365 |
| 4,450,847 | 5/1984 | Owens | 131/365 |

Primary Examiner—V. Millin
Attorney, Agent, or Firm—Kerkam, Stowell, Kondracki & Clarke

[57] ABSTRACT

A smoking article wrapper which when combined with a suitable tobacco column produces up to 75% less particulate sidestream smoke than do prior art cigarette paper wrappers and to methods of producing same. The paper conains freshly precipitated magnesium hydroxide filler precipitated by an equal or near equal stoichiometric addition rate process in the presence of the particulate magnesium hydroxide and/or calcium co-filler(s) and in the absence of the cellulosic pulp fibers.

42 Claims, No Drawings

SMOKING ARTICLE WRAPPER AND METHOD OF MAKING SAME

This invention relates to a smoking article wrapper which when provided with a suitable tobacco column produces up to 75% less particulate sidestream smoke than do cigarettes fabricated with conventional cigarette paper wrappers and to methods of producing same.

BACKGROUND OF THE INVENTION

It has been the endeavor of the industry to reduce visible sidestream smoke which most non-smokers consider to be irritating and offensive. Some of the patents dealing with sidestream are as follows.

U.S. Pat. No. 4,231,377, to W. K. Cline and R. H. Martin is directed to a cellulosic wrapper for a tobacco charge which contains at least 15% magnesium oxide and at least 0.5% of a chemical adjuvant selected from alkali metal acetates, carbonates, citrates, nitrates, and tartrates. Both a smoking product and the method of smoking product preparation are disclosed. Furthermore, the patent discloses that magnesium oxide, as referred to in the patent, includes its hydrate, magnesium hydroxide, and mixtures of magnesium oxide and magnesium hydroxide.

U.S. Pat. No. 4,420,002, to W. K. Cline is directed to a cellulosic wrapper for a tobacco charge which contains 5% to 50% magnesium hydroxide filler having a median particle size less than 10 micrometers and an unreactive magnesium oxide filler. In addition, this patent discloses that best results are achieved by adding the magnesium hydroxide filler to the fiber pulp furnish to achieve an intimate contact between filler and fibers. Both a smoking product and the method of smoking product preparation are described.

U.S. Pat. No. 4,433,697, to W. K. Cline and W. F Owens is directed to a cellulosic wrapper for a smoking article which contains 1% to 5% of a ceramic fiber plus magnesium hydroxide and/or magnesium oxide fillers. The ceramic fibers were selected from a group consisting of polycrystalline alumina, aluminum silicate, and amorphous alumina. Furthermore, this patent discloses that the addition of ceramic fiber provides a more solid ash and even greater sidestream smoke reduction than the prior art. Again, both a smoking product and the method of smoking product preparation are disclosed.

U.S. Pat. No. 4,450,847 to W. F. Owens is directed to a cellulosic wrapper containing amorphous magnesium hydroxide gel freshly precipitated on the fibers of the sheet as a filler, plus unreactive magnesium oxide, calcium carbonate or both as co-filler(s). Furthermore, this patent specifically discloses a wrapper with 2% to 8% by weight of potassium acetate as a chemical adjuvant. A key disclosure in the patent pertains to the physical characteristics of an "amorphous gel of magnesium hydroxide" and the manner in which deposition of said gel on the fiber or paper provides more intimate contact and complete coverage of the paper fibers during in situ precipitation. In addition to the wrapper, itself, both a smoking product and the method of smoking product preparation are disclosed.

In a co-pending concurrently filed application by R. H. Martin, there is disclosed a cellulosic wrapper containing up to 15% precipitated magnesium hydroxide filler, up to 25% particulate magnesium hydroxide filler, 0% to 10% calcium carbonate filler, and up to 5% by weight of sodium and potassium acetate burning chemicals. Furthermore, the optimum median particle size of the particulate magnesium hydroxide is a relatively large 15 micrometers. This large particle size would not be expected by "one skilled in the art". A reduction in sidestream particulate delivery rate of up to 80% is disclosed. A cigarette which exhibits a 70% or greater reduction in sidestream particulate smoke is perceived by an observer as producing little, if any, sidestream smoke during static burning.

BRIEF DESCRIPTION OF THE INVENTION

The purpose of this invention is to provide a cigarette paper with good appearance and high opacity which when fabricated into a cigarette with a suitable tobacco column statically burns at an optimum rate and produces up to 75% less particulate sidestream smoke than do cigarettes fabricated with conventional cigarette paper wrappers. More specifically, these desirable physical and smoking characteristics are accomplished by incorporating high levels of freshly precipitated magnesium hydroxide filler which is prepared by a controlled precipitation reaction producing hard, granular, fast-settling magnesium hydroxide particles. In addition, particulate magnesium hydroxide and calcium carbonate co-fillers may be employed to optimize desired burning and sidestream smoke properties.

DETAILED DESCRIPTION OF THE INVENTION

In the specification and claims the words "freshly precipitated magnesium hydroxide" means using the precipitate before any appreciable agglomeration takes place.

Based on the prior art described above, there has been developed two low sidestream cigarette paper products. The first a commercial product, disclosed in U.S. Pat. No. 4,450,847 which consistently provides a nominal 50% reduction in sidestream particulate delivery rate as compared to 2.1±0.1 mg/min for a conventional cigarette. This paper product contains 12% to 15% in situ precipitated magnesium hydroxide filler, 28% to 25% calcium carbonate filler and approximately 4% by weight of potassium and sodium acetate burning chemicals. The second, a developmental product, contains precipitated magnesium hydroxide, particulate magnesium hydroxide, and calcium carbonate fillers and 4% to 5% potassium and sodium acetate burning chemicals. The preferred particulate magnesium hydroxide filler has the relatively large median particle size of 15 micrometers. This product is disclosed and claimed in co-pending application of R. H. Martin filed even date herewith.

While the product of the said R. H. Martin application meets and even exceeds sidestream smoke reduction requirements; three specific properties are less than optimum, e.g., (1) low sheet opacity (2) low static burning rate, and (3) marginal ash appearance. All three properties relate to the large particle size of the particulate magnesium hydroxide filler which is partly responsible for the extraordinarily high sidestream smoke reductions. The large magnesium hydroxide filler particles are far above the optimum particle size for efficient visible light scattering, depress or lower the static burning rate of the sheet by decreasing both heat transfer and peripheral burning cone temperature, and cause less cohesive ash due to the slower combustion rate and inherent geometric effect. A means of optimizing the three properties cited above without significantly affecting the excellent sidestream reduction properties of this paper is required.

A literature investigation revealed that magnesium hydroxide particle size, slurry viscosity, settling rate, sediment volume, etc. obtained during the precipitation of magnesium hydroxide depend upon the stoichiometric rate of reagent addition, concentration, magnesium salt anion, hydroxide cation, temperature, agitation, etc. These controlling factors are summarily discussed in articles by S. B. Kanungo, P. K. Pe and U. P. Basu, Indian J. Technol. 8 (1970), 23 and by O. Sohnel and J. Maracek, Kristal and Tecknik, 13 (1978), 253. Paramount to control of magnesium hydroxide particle size is the rate of reactant addition, e.g., adding chemical equivalents of hydroxide and magnesium salt together at equal or near equal rates (equivalents/unit time) provides a granular precipitate with a high settling rate and a low sediment volume. This infers that individual magnesium hydroxide particles or aggregates are relatively large, as opposed to the extremely small particles found in highly gelatinous precipitates with very slow settling rates and large sediment volumes. Deviations from exactly equal addition rate conditions for either reactant result in magnesium hydroxide slurries exhibiting higher viscosities, slower settling rates and larger sediment volumes which is indicative of smaller particles and increasing gel structure formation. In fact, precisely setting the relative addition rate of the two reagents at various values near the equal (1:1) stoichiometric rate condition constitutes a method of controlling magnesium hydroxide slurry viscosity and consequent particle size. Furthermore, observations have revealed that the type, particle size and amount of "seed" material such as particulate magnesium hydroxide or calcium carbonate present in the slurry during precipitation influence the final viscosity of the slurry, the resulting paper and its smoking properties. Thus, the magnesium hydroxide particle size can readily be optimized during precipitation by controlling the variables described above.

This ability to control magnesium hydroxide particle size has proven beneficial in improving the sheet opacity, combustibility and ash appearance of low sidestream cigarette papers containing magnesium hydroxide filler. Freshly precipitated magnesium hydroxide with a larger median particle size and essentially neutral charge does not coat the flax fibers as effectively as very small, highly charged magnesium hydroxide particles, thereby increasing combustibility. For this reason all of the precipitated magnesium hydroxide filler prepared by the previously patented and described process and part or all of the large size particulate magnesium hydroxide filler can be replaced with precipitated magnesium hydroxide from the controlled process with a resulting net improvement in sheet combustibility. The median particle size of the magnesium hydroxide from the controlled precipitation process actually determines the static burning rate and sidestream particulate delivery rate of the sheet. Sidestream smoke reduction is still quite excellent due to the inherently high activity of freshly precipitated magnesium hydroxide whether large or small particles. Furthermore, the larger precipitated magnesium hydroxide particles improve sheet opacity by providing more efficient light scattering and sheet tensile strength by increasing fiber-to-fiber bonding area.

This invention constitutes a novel means of attaining high magnesium hydroxide filler levels in low sidestream cigarette paper which provides excellent sidestream particulate smoke reduction at normal to high static burning rates. This is accomplished by employing magnesium hydroxide from a controlled precipitation process which produces granular, fast-settling magnesium hydroxide particles. Precipitated magnesium hydroxide from this controlled process is incorporated as a filler into the sheet at levels from 2% to 60% by weight along with particulate magnesium hydroxide as a co-filler at levels of 0% to 40% and/or calcium carbonate as a co-filler at levels of 0% to 40%. The preferred wrapper embodying the above filler system is a 100% flax pulp sheet weighing 45 g/M$^2$, containing a total filler level of 30% to 40% by weight, 20% to 30% of which is freshly precipitated magnesium hydroxide filler from the controlled process, and 10% to 20% of which is calcium carbonate co-filler. Reductions in sidestream particulate delivery rate of 60% to 75% are attained.

EXAMPLE 1

The initial investigation of the above cited concept was an evaluation of precipitation process effects on handsheet combustibility. A variety of reagent addition modes were evaluated and a "worst-case" combustibility model was selected for handsheet composition. This handsheet contained 15% freshly precipitated magnesium hydroxide filler and 25% particulate magnesium hydroxide co-filler with a 15 micrometer median particle size. This specific handsheet composition has consistently exhibited self-extinction during earlier handsheet and smoking studies. Reagent addition mode, pH, viscosity, static burning rate and static sidestream particulate delivery rate are shown below. The stoichiometrically exact number of chemical equivalents for both reagents was added for each experiment with only the mode of reagent addition being varied.

| Handsheet Designation* | Reagent Addition Mode | Slurry pH | Slurry Viscosity (cps) | Static Burning Rate (Mg/Min) | Sidestream Particulate Delivery Rate (Mg/Min) |
| --- | --- | --- | --- | --- | --- |
| VBR 6535 1B | Add NaOH to Mg(OAc)$_2$ | 11.26 | 960 | SE | SE |
| VBR 6535 2B | Add Mg(OAc)$_2$ to NaOH | 9.55 | 380 | SE | SE |
| VBR 6535 3B | NaOH and Mg(OAc)$_2$ added together at equal rate | 10.05 | 25 | 36.1 | 0.56 |
| VBR 6535 4B | NaOH and Mg(OAc)$_2$ added together at equal rate (Cold, 5° C.) | 10.0 | 40 | SE | SE |
| VBR 6535 7B | Add NaOH and Mg(OAc)$_2$ together with Mg(OAc)$_2$ added 10% faster | 9.82 | 520 | SE | SE |
| VBR 6535 8B | Add NaOH and Mg(OAc)$_2$* | 9.67 | 200 | SE | SE |

-continued

| Handsheet Designation* | Reagent Addition Mode | Slurry pH | Slurry Viscosity (cps) | Static Burning Rate (Mg/Min) | Sidestream Particulate Delivery Rate (Mg/Min) |
|---|---|---|---|---|---|
| VBR 6536 10B | together with NaOH added 10% faster NaOH and Mg(OAc)₂ added together - 90% NaOH added then final 10% NaOH added | 9.50 (90%) 9.82 (10%) | 140 (90%) 375 (10%) | SE | SE |
| VBR 6535 11B | NaOH and Mg(OAc)₂ Added together - 90% Mg(OAc)₂ added then final 10% Mg(OAc)₂ added | 11.73 (90%) 9.68 (10%) | 100 (90%) 80 (10%) | SE | SE |

*Handsheet specifications: 45 g/M² basis weight, 40% total filler, 90% flax/10% wood pulp fiber furnish, treated with 8% solution of potassium acetate burning chemical.

The above results are both dramatic and definitive. Only one addition mode furnishes a handsheet which sustains a static burn, i.e., the mode in which the two reagents are combined at equal stoichiometric addition rates under ambient temperature conditions. The slurry viscosities of the precipitated magnesium hydroxide suspension are likewise dramatic and confirm the unique physical characteristics of magnesium hydroxide precipitated by the equal addition rate method. With the exception of one low porosity sheet, VBR 6535-1B, porosity exerted little, if any, impact on burning characteristics. Coresta porosity for the series was relatively constant at 24.3±4 air permeability units.

EXAMPLE 2

A number of handsheet screening experiments were conducted to determine the effects of high levels of precipitated magnesium hydroxide filler from the equal addition rate process, little or no particulate magnesium hydroxide co-filler and moderate levels of calcium carbonate co-filler on static burning rate and sidestream particulate delivery rate. All handsheets were prepared from precipitated magnesium hydroxide which was obtained from the equal addition rate process; furthermore, precipitation was conducted in the presence of other co-filler(s). Fiber furnish, level of precipitated magnesium hydroxide filler, level of calcium carbonate filler, slurry viscosity, static burning rate and sidestream particulate delivery rate are shown in the following table.

process, little or no particulate magnesium hydroxide co-filler and moderate levels of calcium carbonate co-filler do indeed result in cigarettes which exhibit moderate to high combustibility and low sidestream particulate delivery rates. Reduction in sidestream particulate delivery rate ranges from 61% to 72% relative to the average 2.1 ±0.1 mg/min delivery rate of conventional commercial cigarettes. The significant increase in static burning rate with increase in precipitated magnesium hydroxide filler from the equal addition rate process is unexpected in view of prior experience with precipitated magnesium hydroxide from other processes and sources.

EXAMPLE 3

The handsheet screening experiments described above confirmed that high levels of precipitated magnesium hydroxide filler from the equal addition rate process along with only a calcium carbonate co-filler offer low sidestream cigarette papers exhibiting very low sidestream particulate delivery rates coupled with enhanced combustibility. In this handsheet study example, the precipitated magnesium hydroxide and calcium carbonate filler levels are systematically varied in order to define the preferred filler levels providing the lowest sidestream particulate delivery rate at the optimum static burning rate. The level of precipitated magnesium hydroxide filler from the equal addition rate process, level of calcium carbonate co-filler, slurry viscosity, static burning rate and sidestream particulate delivery rate are shown in the following table.

| Handsheet Designation* | Fiber Furnish | % Precipitated Mg(OH)₂ Filler | % CaCO₃ Filler | Slurry Viscosity (cps) | Static Burning Rate (Mg/Min) | Sidestream Particulate Delivery Rate (Mg/Min) |
|---|---|---|---|---|---|---|
| VBR 6535 14B | 70% flax/30% wood pulp | 20 | 20 | 60 | 54.0 | 0.81 |
| VBR 6535 15B | 70% flax/30% wood pulp | 25 | 15 | 75 | 57.8 | 0.76 |
| VBR 6535 13B | 80% flax/20% wood pulp | 20 | 20 | 20 | 38.3 | 0.67 |
| VBR 6535 8B | 90% flax/10% wood pulp | 25 | 15 | 65 | 49.0 | 0.58 |
| VBR 6544 4B | 90% flax/10% wood pulp | 25** | 15 | 85 | 41.9 | 0.62 |
| VBR 6548 10B | 100% flax | 25 | 15 | 90 | 42.9 | 0.61 |
| VBR 6548 12B | 100% flax | 30 | 10 | 45 | 78.8 | 0.61 |

*Handsheet Specifications: 45 g/M² basis weight, 40% total filler, treated with an 8% solution of potassium acetate burning chemical
**20% precipitated Mg(OH)₂ filler and 5% particulate Mg(OH)₂ filler (15 micrometer median particle size)

The above data reveal that low sidestream cigarette paper handsheets containing high levels of precipitated magnesium hydroxide filler from the equal addition rate

| Handsheet Designa-tion* | % PPT Mg(OH)$_2$ Filler | % CaCO$_3$ Filler | Viscos-ity (cps) | Static Burning Rate (mg/min) | Sidestream Particulate Delivery Rate (mg/min) |
| --- | --- | --- | --- | --- | --- |
| 1B | 15 | 25 | 25 | 70.8 | 0.87 |
| 2B | 20 | 20 | 60 | 52.3 | 0.75 |
| 8B | 25 | 15 | 65 | 49.0 | 0.58 |
| 12B | 30 | 10 | 45 | 78.8 | 0.61 |
| 3B | 35 | 5 | 45 | 108.5 | 0.93 |
| 4B | 40 | 0 | 160 | SE | SE |

*Handsheet Specifications: 45 g/M$^2$ basis weight, 40% total filler, 90% flax/10% wood pulp fiber furnish, treated with an 8% solution of potassium acetate burning chemical.

The results of this study are unequivocal. A distinct minimum in static burning rate is displayed in the precipitated magnesium hydroxide filler level range of 20% to 25%. In the case of the sidestream particulate delivery rate, magnesium hydroxide filler level range is optimized at 25% to 30%. Thus, optimum smoking characteristics occur at filler levels of 25% precipitated magnesium hydroxide and 15% calcium carbonate. A sheet of this filler composition demonstrates a static burning rate of about 50 mg/min and a sidestream particulate delivery rate of approximately 0.60 mg/min (71% reduction), both totally acceptable values.

EXAMPLE 4

Since a chemical adjuvant, commonly referred to as a burning chemical, is an essential ingredient of low sidestream cigarette papers based on the magnesium hydroxide/oxide filler system in its various permutations, machine-made low sidestream cigarette paper with precipitated magnesium hydroxide filler from the equal addition rate process and calcium carbonate co-filler was treated with various levels of potassium acetate burning chemical and evaluated for sidestream smoke characteristics.

Machine-made low sidestream cigarette paper from trial RD 99827 run with water on the size press was used for this evaluation. It is a 45g/M$^2$ basis weight sheet containing 25% precipitated magnesium hydroxide filler from the equal rate addition process and 15% calcium carbonate co-filler; the magnesium hydroxide was precipitated in the presence of the calcium carbonate co-filler. This sheet had an average porosity of 19 Coresta and Tappi opacity of 84.2%. This opacity is a dramatic improvement over the average 70% Tappi opacity value exhibited by machine-made low sidestream cigarette papers with dual particulate/precipitated magnesium hydroxide fillers. Although the RD 99827 paper used in this study was produced with water on the size press, it still contained about 1.5% to 2.0% by weight of sodium acetate burning chemical which came from the off-line precipitation reaction between magnesium acetate and sodium hydroxide.

Paper from trial RD 99827 was treated with aqueous solutions of 2%, 4%, 6%, 8%, 10% and 12% by weight of potassium acetate burning chemical on a 4"-wide laboratory size press. Cigarettes were prepared from these papers and smoked. Static burning rates and sidestream particulate delivery rates are shown in the following table.

| % KOAc in Sizing Solution | Static Burning Rate (mg/min) | Sidestream Particulate Delivery Rate (mg/min) |
| --- | --- | --- |
| 2 | 45.2 | 0.78 |
| 4 | 50.3 | 0.81 |
| 6 | 52.7 | 0.77 |
| 8 | 55.0 | 0.78 |
| 10 | 54.5 | 0.82 |
| 12 | 54.1 | 0.73 |

The above date reveal that static burning rate increases regularly from 2% potassium acetate treatment up to the 6% to 8% burning chemical treatment level. From this point on, static burning rate remains essentially constant with increasing burning chemical treatment level. The sidestream particulate delivery rate results are entirely different; the sidestream particulate delivery rate remains essentially constant over the burning chemical treatment range at 0.78 ± 0.04 mg/min. Thus, the results of this experiment indicate that burning chemical level effects static burning rate, but has essentially no effect on sidestream particulate delivery rate.

SUMMARY OF THE INVENTION

Optimum combustion properties and excellent reductions in sidestream particulate delivery rate and yield are achieved by a low sidestream cigarette paper characterized as:

1. Containing cellulosic pulp fibers such as those provided by flax pulp or chemical wood pulp for use in conventional cigarette papers.
2. Having a basis weight between 30 g/M$^2$ and 100 g/M$^2$.
3. Containing freshly precipitated magnesium hydroxide filler from a controlled reaction process, particulate magnesium hydroxide co-filler and/or calcium carbonate co-filler.
4. Containing freshly precipitated magnesium hydroxide filler from a controlled reaction based on reagent addition at equal or near equal stoichiometric addition rates.
5. Containing freshly precipitated magnesium hydroxide filler from a controlled precipitation reaction between a soluble magnesium salt such as the chloride, nitrate, cetate, etc. and a Group IA or IIA hydroxide.
6. Containing freshly precipitated magnesium hydroxide filler precipitated by an equal or near equal stoichiometric addition rate process in the presence of the particulate magnesium hydroxide and/or calcium carbonate co-filler(s) and in the absence of the cellulosic pulp fibers.
7. Containing freshly precipitated magnesium hydroxide filler from a controlled reaction at a filler level of 2% to 60% by weight in the sheet with 15% to 35% preferred.
8. Containing particulate magnesium hydroxide co-filler at a filler level of 0% to 40% by weight in the sheet with 0% to 25% preferred.
9. Containing particulate magnesium hydroxide filler having a particle size of less than 2 micrometers to 50 micrometers in diameter with a median particle size of 10 to 15 micrometers preferred.

Low sidestream cigarette papers embodying the features described above provide a sheet demonstrating good formation and very high opacity, optimum combustibility and sidestream particulate delivery rates approaching 0.60 mg/min or a 71% reduction relative to conventional commercial cigarettes.

What is claimed:

1. A wrapper for smoking articles such as cigarettes, cigars and the like comprising a cellulosic fiber sheet containing, as filler, freshly precipitated magnesium hydroxide filler from a controlled reaction based on reagent addition at essentially equal stoichiometric rates applied to the cellulosic fibers.

2. A wrapper for smoking articles such as cigarettes, cigars and the like comprising a cellulosic fiber sheet containing, as filler, freshly precipitated magnesium hydroxide filler from a controlled reaction based on reagent addition at essentially equal stoichiometric rates applied to the cellulosic fibers, wherein the freshly precipitated magnesium hydroxide filler is precipitated in the presence of particulate magnesium hydroxide co-filler and in the absence of the cellulosic fibers.

3. The wrapper as defined in claim 2 wherein the freshly precipitated magnesium hydroxide filler level is from 2% to 60% by weight in the sheet.

4. The wrapper as defined in claim 2 wherein the freshly precipitated magnesium hydroxide filler level is from 15% to 35%.

5. The wrapper as defined in claim 2 wherein the particulate magnesium hydroxide co-filler is at a filler level of 0% to 40%.

6. The wrapper as defined in claim 2 wherein the particulate magnesium hydroxide co-filler is at a filler level of 0% to 25%.

7. The wrapper as defined in claim 2 wherein the particulate magnesium hydroxide co-filler has particle sizes of less than 2 micrometers to 50 micrometers in diameter with particle sizes of 10 to 15 micrometers in diameter preferred.

8. The wrapper as defined in claim 2 further including burning chemicals potassium acetate and sodium acetate separately and in mixtures thereof at levels of 1% to 8% by weight in the sheets with 3% to 5% preferred.

9. A wrapper for smoking articles such as cigarettes, cigars and the like comprising a cellulosic fiber sheet containing, as filler, freshly precipitated magnesium hydroxide filler from a controlled reaction based on reagent addition at essentially equal stoichiometric rates applied to the cellulosic essentially equal stoichiometric rates applied to the cellulosic fibers, wherein the freshly precipitated magnesium hydroxide filler is precipitated in the presence of calcium carbonate co-filler and in the absence of the cellulosic fibers.

10. The wrapper as defined in claim 9 wherein the freshly precipitated magnesium hydroxide filler level is from 2% to 60% by weight in the sheet.

11. The wrapper as defined in claim 9 wherein the freshly precipitated magnesium hydroxide filler level is from 15% to 35%.

10. Containing calcium carbonate co-filler at a filler level of 0% to 40% by weight in the sheet with 5% to 30% preferred.

11. Containing the chemical adjuvants, or burning chemicals, potassium acetate and sodium acetate separately or in mixtures thereof at levels of 1% to 8% by weight in the sheet with 3% to 5% preferred.

12. The wrapper as defined in claim 9 wherein the calcium carbonate co-filler is at a filler level of 0% to 40%.

13. The wrapper as defined in claim 9 wherein the calcium carbonate co-filler is at a filler level of 5% to 30%.

14. The wrapper as defined in claim 9 further including burning chemicals potassium acetate and sodium acetate separately and in mixtures thereof at levels of 1% to 8% by weight in the sheets with 3% to 5% preferred.

15. A smoking article comprising a tobacco charge and a wrapper for the tobacco charge, said wrapper comprising a cellulosic fiber sheet containing, as filler, freshly precipitated magnesium hydroxide filler from a controlled reaction based on reagent addition at essentially equal stoichiometric addition rates applied to the cellulosic fibers.

16. A smoking article comprising a tobacco charge and a wrapper for the tobacco charge, said wrapper comprising a cellulosic fiber sheet containing, as filler, freshly precipitated magnesium hydroxide filler from a controlled reaction based on reagent addition at essentially equal stoichiometric addition rates applied to the cellulosic fibers, wherein the freshly precipitated magnesium hydroxide filler is precipitated in the presence of particulate magnesium hydroxide co-filler and in the absence of cellulosic fibers.

17. A smoking article as defined in claim 16 wherein the freshly precipitated magnesium hydroxide filler level is from 2% to 60% by weight in the sheet.

18. A smoking article as defined in claim 16 wherein the freshly precipitated magnesium hydroxide filler level is from 15% to 30%.

19. A smoking article as defined in claim 16 wherein the particulate magnesium hydroxide co-filler is at a filler level of 0% to 40%.

20. A smoking article as defined in claim 16 wherein the particulate magnesium hydroxide co-filler is at a filler level of 5% to 30%.

21. A smoking article as defined in claim 16 wherein the particulate magnesium hydroxide filler is a filler level of 0% to 25%.

22. A smoking article as defined in claim 16 wherein the particulate magnesium hydroxide filler has particle sizes of less than 2 micrometers to 50 micrometers in diameter with particle sizes of 10 to 15 micrometers in diameter preferred.

23. A smoking article as defined in claim 16 further including burning chemicals potassium acetate and sodium acetate separately and in mixtures thereof at levels of 1% to 8% by weight in the sheets with 3% to 5% preferred.

24. A smoking article comprising a tobacco charge and a wrapper for the tobacco charge, said wrapper comprising a cellulosic fiber sheet containing, as filler, freshly precipitated magnesium hydroxide filler from a controlled reaction based on reagent addition at essentially equal stoichiometric addition rates applied to the cellulosic fibers, wherein the freshly precipitated magnesium hydroxide filler is precipitated in the present of calcium carbonate co-filler and in the absence of the cellulosic fibers.

25. A smoking article as defined in claim 24 wherein the freshly precipitated magnesium hydroxide filler level is from 2% to 60% by weight in the sheet.

26. A smoking article as defined in claim 24 wherein the freshly precipitated magnesium hydroxide filler level is from 15% to 35%.

27. A smoking article as defined in claim 24 wherein the calcium carbonate co-filler is at a filler level of 0% to 40%.

28. A smoking article as defined in claim 24 wherein the calcium carbonate co-filler is at a filler level of 5% to 30%.

29. A smoking article as defined in claim 24 further including burning chemicals potassium acetate and sodium acetate separately and in mixtures thereof at levels of 1% to 8% by weight in the sheets with 3% to preferred.

30. A method for reducing the visible sidestream smoke emanated from a smoking article comprising wrapping the tobacco charge in the smoking article in a combustible cellulosic sheet containing, as a filler, a freshly precipitated magnesium hydroxide filler from a controlled reaction based on reagent addition at essentially equal stoichiometric addition rates applied to the cellulosic fibers.

31. The method as defined in claim 30 wherein the freshly precipitated magnesium hydroxide filler is precipitated in the presence of particulate magnesium hydroxide filler and in the absence of the cellulosic fibers.

32. The method as defined in claim 31 wherein the freshly precipitated magnesium hydroxide filler is added to a level of from 2% to 60% by weight in the sheet.

33. The method as defined in claim 31 wherein the freshly precipitated magnesium hydroxide filler is added at a level of from 15 to 30%.

34. The method as defined in claim 31 wherein the particulate magnesium hydroxide is added at a filler level of 0% to 40%

35. The method as defined in claim 31 wherein the particulate magnesium hydroxide filler has particle sizes of less than 2 micrometers to 50 micrometers in diameter with particle sizes of 10 to 15 micrometers in diameter preferred.

36. The method as defined in claim 31 further including adding burning chemicals potassium acetate and sodium acetate separately and in mixtures thereof at levels of 1% to 8% by weight in the sheets with 3% to 5% preferred.

37. The method as defined in claim 30 wherein the freshly precipitated magnesium hydroxide filler is precipitated in the presence of calcium carbonate cofiller and in the absence of the cellulosic fibers.

38. The method as defined in claim 37 wherein the freshly precipitated magnesium hydroxide filler level is from 2% to 60% by weight in the sheet.

39. The method as defined in claim 37 wherein the freshly precipitated magnesium hydroxide filler level is from 15% to 35%.

40. The wrapper as defined in claim 37 wherein the calcium carbonate co-filler is at a filler level of 0% to 40%.

41. The wrapper as defined in claim 37 wherein the calcium carbonate co-filler is at a filler level of 5% to 30%.

42. The wrapper as defined in claim 37 further including burning chemicals potassium acetate and sodium acetate separately and in mixtures thereof at levels of 1% to 8% by weight in the sheets with 3% to 5% preferred.

* * * * *

UNITED STATES PATENT AND TRADEMARK OFFICE
CERTIFICATE OF CORRECTION

PATENT NO. : 4,915,118

DATED : April 10, 1990

INVENTOR(S) : Clifford M. KAUFMAN and Richard H. MARTIN

It is certified that error appears in the above-identified patent and that said Letters Patent is hereby corrected as shown below:

Column 9, Claim 9, lines 6 and 7, "essentially equal stoichiometric rates applied to the cellulosic" should be omitted (double inclusion).

Column 12, Claim 37, line 3, "cofiller" should be --co-filler--.

Signed and Sealed this

First Day of October, 1991

Attest:

HARRY F. MANBECK, JR.

Attesting Officer

Commissioner of Patents and Trademarks